(12) United States Patent
Moran et al.

(10) Patent No.: US 7,293,281 B1
(45) Date of Patent: Nov. 6, 2007

(54) METHOD AND SYSTEM FOR VERIFYING A CLIENT REQUEST

(75) Inventors: Tal Moran, Tel Aviv (IL); Yuval El-Hanani, Tel Aviv (IL); Gil Raanan, Zoran (IL); Eran Reshef, Tel Aviv (IL)

(73) Assignee: Watchfire Corporation, Kanata, Otario (CA)

( * ) Notice: Subject to any disclaimer, the term of this patent is extended or adjusted under 35 U.S.C. 154(b) by 702 days.

(21) Appl. No.: 09/696,736

(22) Filed: Oct. 25, 2000

Related U.S. Application Data

(60) Provisional application No. 60/161,473, filed on Oct. 25, 1999.

(51) Int. Cl.
  *G06F 7/06* (2006.01)
  *G06F 7/04* (2006.01)
  *H04L 9/32* (2006.01)
  *G11C 13/00* (2006.01)

(52) U.S. Cl. .............. 726/3; 726/4; 726/21; 726/2; 705/51; 705/52

(58) Field of Classification Search ............ 705/51, 705/52; 713/165, 166, 170, 182; 726/3, 726/4
See application file for complete search history.

(56) References Cited

U.S. PATENT DOCUMENTS

| | | | |
|---|---|---|---|
| 5,347,578 A * | 9/1994 | Duxbury ................. 707/9 |
| 5,559,800 A | 9/1996 | Mousseau et al. ...... 370/85.13 |
| 5,611,048 A | 3/1997 | Jacobs .................. 395/200.9 |
| 5,623,601 A | 4/1997 | Vu ...................... 395/187.01 |
| 5,870,544 A | 2/1999 | Curtis .................. 395/187.01 |
| 5,908,469 A * | 6/1999 | Botz et al. ................ 713/201 |
| 5,940,590 A * | 8/1999 | Lynne et al. ............. 713/200 |
| 6,202,199 B1 * | 3/2001 | Wygodny et al. ........ 717/125 |
| 6,289,462 B1 * | 9/2001 | McNabb et al. ......... 713/201 |

OTHER PUBLICATIONS

Bieber et al., "Formal Techniques for an ITSEC-E4 Secure Gateway",1996, pp. 236-245.
Freemand, et al. "Developing Secure System: Issues and Solutions", 1998, pp. 183-190.
Kogan et al., "An Audit Model for Objected-Oriented Databases", 1991, pp. 90-99.
Lin et al., "Abstraction-Based Misuse Detection: High-Level Specifications an Adaptable Strategies".
Petersen et al., "IDA-Intrusion Detection Alert",1992, pp. 306-311.
Sandhu et al., "Role-Based Access Control: A Multi-Dimensional View", 1994, pp. 54-62.

(Continued)

*Primary Examiner*—Kambiz Zand
*Assistant Examiner*—William S Powers
(74) *Attorney, Agent, or Firm*—Thelen Reid Brown Raysman & Steiner LLP

(57) ABSTRACT

A system and method are presented for authorizing execution of requested actions transmitted between clients and servers of a data processing system. The method includes receiving a message including a set of actions and simulating execution of the set of actions. A list representing allowable actions and user-definable inputs to the simulated actions is defined. The list of allowable actions and user-definable inputs to the allowable action is then compared to user-requested actions and inputs. When elements within the user-requested actions and inputs are included in the allowable actions and input list, the user-requested actions and inputs are authorized for execution.

13 Claims, 5 Drawing Sheets

OTHER PUBLICATIONS

Song, et al., "Design and Implementation of a Security Management System", 1995, pp. 261-264.

International Preliminary Examination Report dated Aug. 6, 2002.

Lin et al., "Abstraction-Based Misuse Detection: High-Level Specifications an Adaptable Strategies", 1998, p. 1-12, Proceedings of 11th Comp. Sec. Found. Workshop.

* cited by examiner

METHOD AND SYSTEM FOR VERIFYING A CLIENT REQUEST

CROSS REFERENCE TO RELATED DOCUMENTS

Priority is herewith claimed under 35 U.S.C. §119(e) from copending Provisional Patent Application No. 60/161,473, filed Oct. 25, 1999, entitled "METHOD AND SYSTEM FOR VERIFYING A CLIENT REQUEST", the disclosure of which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

OTHER APPLICATIONS

This application is related to the following pending applications:
  U.S. patent application Ser. No. 09/345,920, entitled METHOD AND SYSTEM FOR EXTRACTING APPLICATION PROTOCOL CHARACTERISTICS, filed Jul. 1, 1999;
  U.S. patent application Ser. No. 09/149,911, entitled METHOD AND SYSTEM FOR PROTECTING OPERATIONS OF TRUSTED INTERNAL NETWORKS, filed Sep. 9, 1998; and
  U.S. patent application Ser. No. 09/150,112, entitled METHOD AND SYSTEM FOR MAINTAINING RESTRICTED OPERATING ENVIRONMENTS FOR APPLICATION PROGRAMS OR OPERATING SYSTEMS, filed Sep. 9, 1998;
  the disclosures of which applications are incorporated by reference herein in their entireties.

BACKGROUND OF THE INVENTION

The present invention relates generally to privacy and security systems and, more particularly, to methods and systems for authorizing requests, data, informational content, applications and other information transmitted between a client device and a host device within a data processing system.

In a client/server data processing system, a number of personal computers, work stations, portable and/or handheld devices or the like ("clients") are linked and communicate with one or more host computers ("servers"). The servers process requests from the clients for information and/or application programs shared by the clients over the network. Increasingly, client/server networks have been linked to form a wider "network of networks" including, for example, intranets and extranets that may themselves be a part of a world-wide network, namely, the World Wide Web portion of the Internet ("web"). The linking of networks permits clients to share resources (e.g., information and application programs) across the networks.

Along with an increase in the availability of shared information and application programs over potentially world-wide networks, there is an increase in the vulnerability of each of the individual client/server networks. For example, an unscrupulous person seeking to retrieve and/or damage proprietary information and application programs stored on one of the networks may access the proprietary information and application programs and use them in an unauthorized way. In an effort to prevent such an unauthorized use, many networks connect to other networks through "firewalls." Conventional firewalls include hardware and/or software systems designed to deal with access control to internal network resources (e.g., a specific web server or a folder), to limit access to portions of a network and to prevent unauthorized retrieval or damage to proprietary information and application programs stored thereon.

Many conventional firewall systems, however, do not deal with the authorization at an application level, and may be defeated by an unscrupulous person masquerading as an authorized client. For example, many web applications assume that the application user is in fact executing a mobile agent of the application on his/her browser. However, a malicious user can connect to a web server without using standard web browser software, thus, the user is not bound to any limitations whatsoever that may be forced at the browser side, and the malicious user can masquerade as a standard client and send destructive or forged data to the web server.

In commonly assigned, U.S. patent application Ser. No. 09/345,920, a solution for verifying requests from a user of a standard HTML document is described. The solution is based on extracting the set or pattern of actions (HTTP requests) the browser software may take, based on the content of the HTML document ("authorized actions"). This set of authorized actions is then matched against requests sent by a client application. Even if the user is not using one of the standard browsers, only requests from within the legal or authorized set of actions will be passed to the web server.

In view of the foregoing, the inventors of the present invention have recognized a need to extend the above-described verification technique to logic (e.g., JavaScript programs embedded into the HTML page) executing on the client system on behalf of the web server. In particular, the inventors have recognized a need for simulating executing of client-side logic to capture and verify external data and events occurring thereon.

BRIEF SUMMARY OF THE INVENTION

It is an object of the present invention to provide a verification technique for logic executing on a client system on behalf of a server system.

It is another object of the present invention to provide a verification technique for client side logic that simulates execution of the logic to capture and verify external data and events occurring therein.

It is a still another object of the present invention to provide a verification technique for client side logic (e.g., JavaScript programs embedded into the HTML page). The technique simulates execution of the logic so that only authorized requests for external data and events are passed from the client to a protected server.

Further objects and advantages of this invention will become more apparent from a consideration of the drawings and ensuing description.

The foregoing and other problems are overcome and the objects are realized by methods and apparatus in accordance with embodiments of this invention, wherein a system and method are presented for authorizing execution of requested actions transmitted between clients and servers of a data processing system. The method includes receiving a message including a set of actions or application programming logic (e.g., JavaScript programs embedded into the HTML page) and simulating execution of the set of actions or logic. A list is defined representing allowable actions and user-definable inputs to the allowable actions. The list of allowable actions and user-definable inputs is then compared to user-requested actions and inputs. When elements within the user-requested actions are included in the allowable actions and inputs list, the message and included set of actions are authorized for execution.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1A:
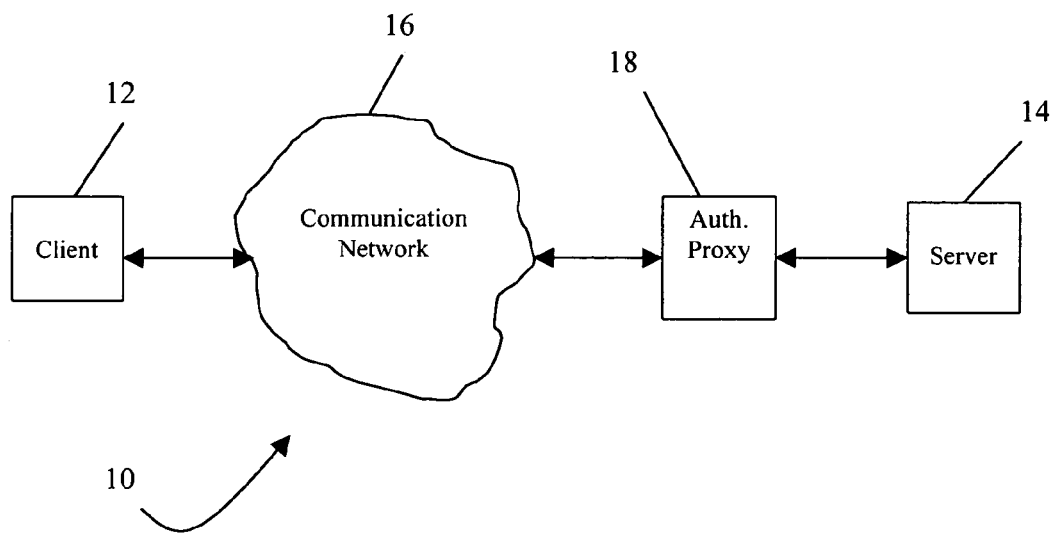
FIG. 1A is a block diagram of a client/server data processing network configured and operating in accordance with one embodiment of the present invention.

FIG. 1A illustrates a client/server data processing network 10 configured and operating in accordance with one embodiment of the present invention. The data processing network 10 includes a plurality of client systems such as personal computers, work stations, portable and/or handheld devices or the like, linked and communicating with one or more host/server computers. For clarity of illustration, the plurality of clients is represented by a client system 12 and the one or more servers are represented by a server 14. It should be appreciated that the client 12 and server 14 may be remote and/or local devices coupled, via wired or wireless connections, to a communication network 16 such as, for example, the World Wide Web portion of the Internet ("web"), an intranet, and extranet or other private network.

In accordance with the present invention, an authorization proxy system 18 is coupled to and enforces a security policy protocol between the client 12 and server 14. For example, the authorization proxy system 18 ensures that only authorized actions (defined below) are performed within, for example, requests, messages, data, informational content, applications and other information transmitted between the client 12 and the server 14. The authorization proxy system 18 simulates execution of commands, fields, user-selectable input options, HTTP requests and the like (e.g., "requested actions") within the requests, messages, data, informational content and applications transmitted between the client 12 and the server 14 and ensures that the requested actions are defined within a set of allowable actions (e.g., "authorized actions"). Any actions not within the set of allowable actions are denied by the authorization proxy 18 before reaching and potentially corrupting the target of the actions (e.g., the server 14 or client 12).

Figure 1B:
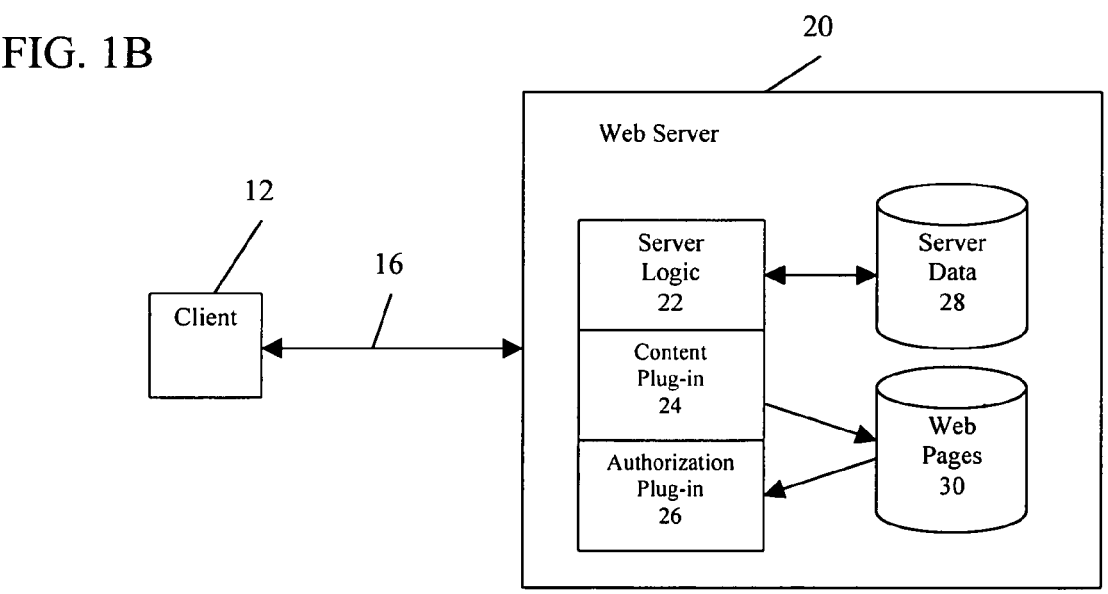
FIG. 1B is a block diagram of a client/server data processing network configured and operating in accordance with another embodiment of the present invention.

It should be appreciated that it is within the scope of the present invention to vary the implementation strategy of the authorization proxy. For example, FIG. 1A depicts the authorization proxy as a hardware component 18 of the network 10 separate and distinct from the server 14. In FIG. 1B, the authorization proxy is implemented as application programming logic ("plug-in" logic 26) executing on a server 20. The server 20 also includes plug-in logic 22 and 24 for providing application programs, informational content and data residing at the server 20, e.g., contained in data store 28 or on web pages 30, to the client 12 upon request. In accordance with the present invention, the authorization plug-in logic 26 executes on the server 20 to verify, prior to transmission, the programs, content and data provided to the client 12.

Figure 1C:
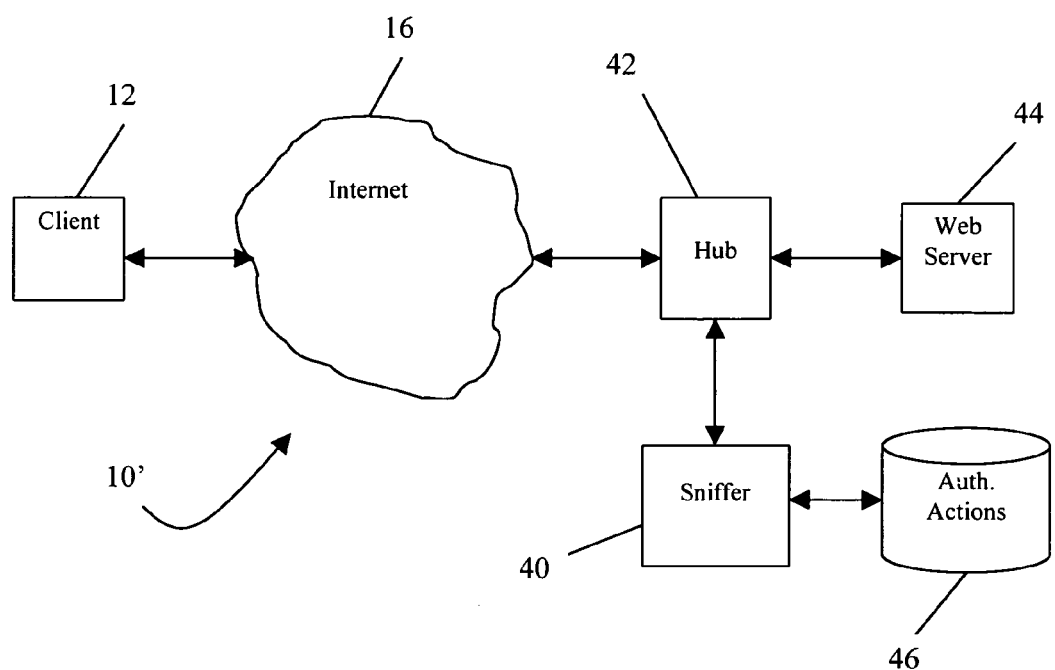
FIG. 1C is a block diagram of a client/server data processing network configured and operating in accordance with yet another embodiment of the present invention.

Alternately, FIG. 1C depicts the authorization proxy operating as an intrusion detection system within a sniffer device 40 coupled to a router or hub 42 on a network 10'. As is generally known, the hub 42 directs communications within a portion of the network 10'. As illustrated in FIG. 1C, the hub 42 isolates web server 44 from direct communication over the network 10'. The sniffer 40 detects and intercepts transmissions targeting the web server 44. The sniffer 40 executes methods described in detail below to evaluate the intercepted transmissions and to compare the actions requested within the transmissions to, for example, a list of authorized actions contained within a storage device 46. If not acceptable, the sniffer 40 alerts or passes a message to another system on the network.

While embodiments of the present invention are described as having particular application in web-based applications, it should be appreciated that it is within the scope of the present invention for the systems and methods described herein to be applicable within any client/server communication systems and, in particular, communication systems where it is desirable to protect the server from unauthorized requests, data and applications.

As described in detail below, the authorization proxy of the present invention employs two techniques for verifying logic executing on a client system on behalf of a server system. In a first technique, the authorization proxy simulates execution of the client side logic and invokes and/or triggers each possible command, field, user-selectable input option and HTTP request. As a result, a full set of allowable browser actions are identified and used to verify subsequent requests from an actual client session. In a second technique, the proxy traces execution of the client-side logic during an actual client session. Results of the trace are transmitted to the authorization proxy within a request for server resources. In response, the authorization proxy simulates execution of the client-side logic and when input options or other requests for external data are encountered during the simulation the trace results are utilized. A successful simulation results in the approval of the client request for server resources and the authorization proxy passes the request to the appropriate server for actual processing.

The two verification techniques differ in the method in which they respond to the client logic's queries of unknown data and user intervention events. A detailed description of these techniques follows.

In a first aspect of the present invention, the authorization proxy (e.g., proxy 18, "plug-in" logic 26 and sniffer 40) invokes methods for evaluating transmissions between clients and servers, simulating client side logic incorporated in the message originating from a client or a server (e.g., JavaScript objects incorporated in a message from the server) and extracting a list of possible requested actions. If the client sends a request, the requested actions are then verified to a list of authorized actions. If the actions are acceptable, the transmissions are passed onto the intended target such that only requests consistent with the intended application are performed.

Figure 2:
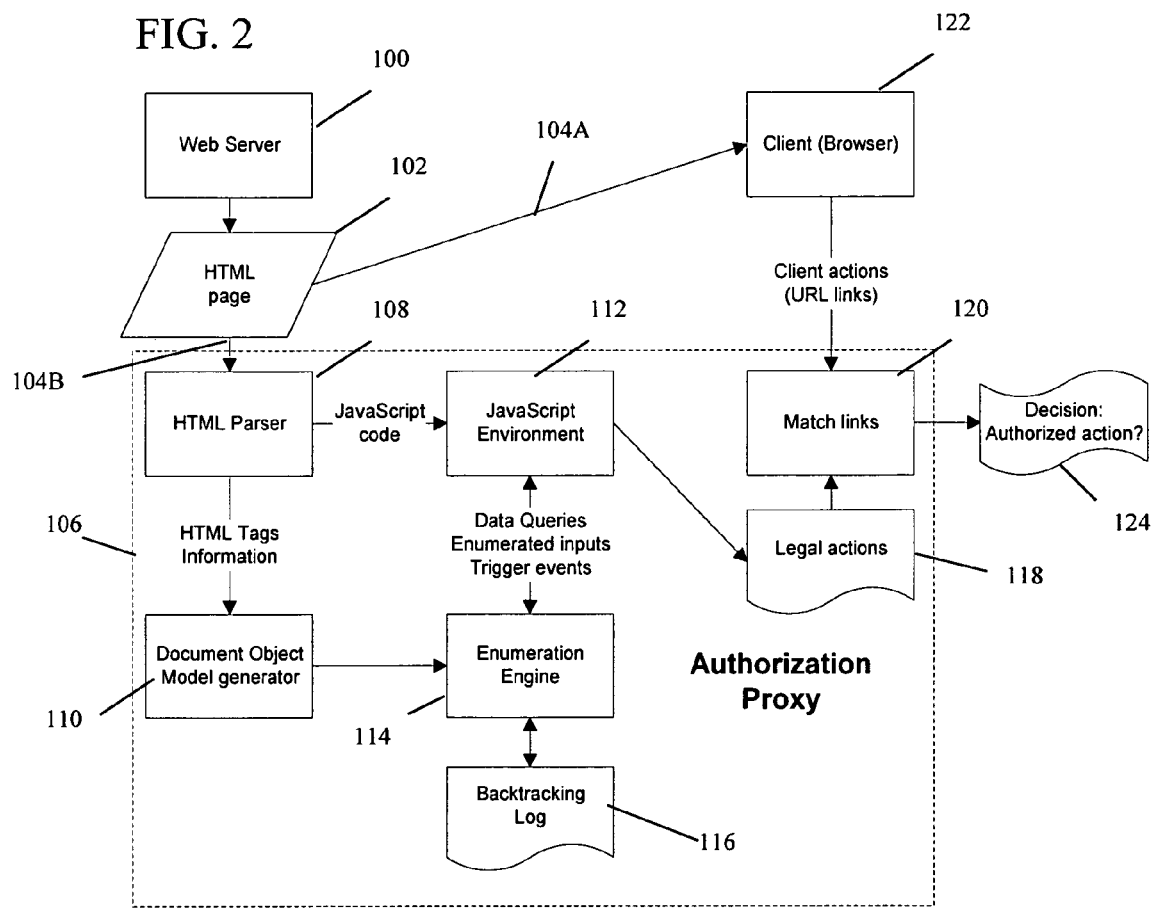
FIG. 2 is a flow chart illustrating an exemplary process for verifying requests between clients and servers using a simulation method in accordance with one embodiment of the present invention.

FIG. 2 is a flowchart illustrating a process for verifying transmissions between clients and servers of a data processing system (e.g., the aforementioned evaluating, simulating and extracting processes). For example, FIG. 2 depicts a transmission (e.g., a HTML web page 102) from a web server to a client (e.g., server 14 and client 12 of FIG. 1). At Block 100, the server 14 transmits the HTML web page 102 to the client 12. The transmission is represented by lines 104A and 104B in FIG. 2. As is shown in FIGS. 1A-1C and 2, any transmission to the client 12 is intercepted by the authorization proxy, 18, 26 and 40, respectively. In response, the authorization proxy invokes a verification process (the details of which are illustrated within dashed lines 106).

At Block 108, the evaluation process is invoked. The evaluation process includes, for example, a parsing of the HTML page 102 to identify content and HTML tags as well as client side logic (e.g., JavaScript code) incorporated therein. Once the components present within the HTML page 102 are identified, the authorization proxy simulates execution of the components of the page 102 (e.g., a simulated browser environment) so that all possible requested actions can be identified within the transmission and provided to the list of authorized actions.

The simulated browser environment includes a JavaScript runtime environment in which the simulated browser's Document Object Model ("DOM") and browser objects are recreated, Blocks 110 and 112, respectively. Some of the JavaScript standard objects need to be replaced, as explained in greater detail below. The authorization proxy executes the components of the HTML page 102 in the simulated environment. Hooks in the environment inform the authorization proxy of any triggered browser actions, e.g., retrieving a document from web server or submitting a form to the web server. Once the simulation is completed, these actions supplement the list of authorized actions that are matched against the client's actual requests (at Block 120), as described below.

As discussed, some of the objects and their methods need to be simulated to represent the client browser environment. Foremost is the DOM, which is created from the HTML document 102. Additionally, there are browser objects such as Navigator, which in Netscape provides information about the browser context and window. An enumeration engine (at Block 114) coordinates the simulation of the DOM and JavaScript components. Objects such as the time object, random functions, etc. are also simulated by the enumeration engine. All these objects need to be consistent with what the script would have obtained, had it accessed them in the client's environment, e.g., on the client browser 122. For example, a text area in the DOM should return the value the user entered in the browser 122, a random function should return the same value the client script obtained in the user's browser 122, and the navigator.userAgent should return the name of the client browser 122.

As should be appreciated, some of the data inputted to browser objects is deduced from the enveloping data, e.g. navigator.userAgent can be obtained from the HTTP headers sent by the client 12 (e.g., within the original request for the HTML page 102). However, some data is dependent on the actual scenario followed in the client side. An additional complexity is introduced in event handlers (e.g., code executed in response to a user action) present within the JavaScript. While JavaScript HTML script tags are executed once loaded, some of the code (e.g., the event handlers) is only executed on user intervention. For example, there exists an onClick event handler for many of the input controls in the HTML language. The corresponding event handler is only executed when the user selects (e.g., "clicks on") the control.

The enumeration engine (Block 114) performs a coverage method. For example, the engine assumes that by triggering all the events in the HTML page 102, as well as performing multiple simulated executions on different possible inputs by the user, it covers all the possible actions by the browser 122. As should be appreciated, the execution time of this embodiment increases exponentially for scripts that depend on many input controls. It may also be difficult to handle the random function in this embodiment. The simulated execution proceeds until it requests user input. At which point, user actions are required to record and simulate further execution with a variety of possible input values. This aspect of the simulation method is discussed in further detail below with reference to FIG. 3.

Once simulation is complete, a list of all possible browser actions is provided that is consistent with the HTML page (and associated client side logic) originating from the server. These possible actions are aggregated and identified as "legal actions" in Block 118. The legal actions are utilized by the authorization proxy to verify the requested actions received from a particular execution of the HTML page 102 at the client browser 122. At Block 120 the client's requested actions are returned to the authorization proxy and compared to the list of legal actions 118 produced from the simulation of the HTML page 102 by the authorization proxy. Accordingly, the authorization proxy accepts or rejects the client's requests depending on the presence or absence of the request and valid user input within the list of legal actions 118 (e.g., requested actions are denied if a corresponding legal action was not identified by the authorization proxy). It should be appreciated that the list of legal actions 118 may be stored (e.g., in the data store 30 (FIG. 1B) and 46 (FIG. 1C)) to accommodate a delay in receipt of the requested actions from the client browser 122.

Figure 3:
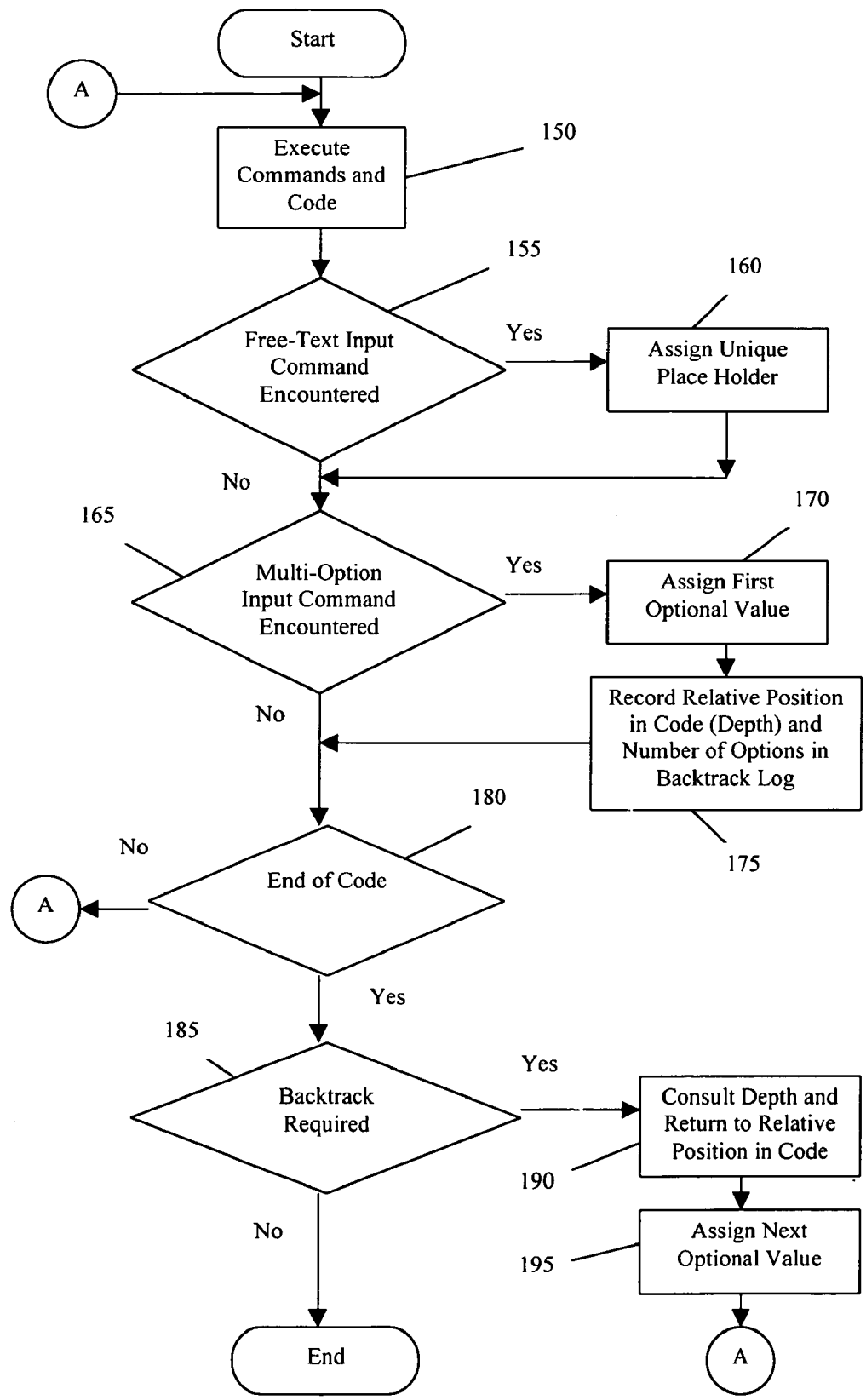
FIG. 3 is a flow chart illustrating an exemplary process for accepting user input to the simulation method of FIG. 2.

With reference to FIG. 3, the following describes options for handling request for user input and multiple possible inputted values within a simulated execution of HTML page 102. As discussed above, at Block 150 the authorization proxy simulates execution of browser commands and the client logic included within the HTML page 102. Simulated execution continues until an input control is encountered (at Block 155) or a request is made for other user input (at Block 165). At Block 155, a free-text input command such as, for example, <TEXT>, <PASSWORD> & <TEXTAREA> HTML tags, is detected within the HTML page 102. If a free-text input command is encountered, control passes to Block 160 where a unique place holder is assigned to represent input received from the client. The place holder assigned at Block 160 is, for example, a field that is later recognized in the generated URL as input generated from a free-text input command in response to a user action. At this later stage, the authorization proxy performs a pattern match with received client requests (Block 120 of FIG. 2). The pattern matching is implemented so that it allows only "safe" expressions. A preferred pattern matching technique is derived from the HTML link extractor described in commonly assigned U.S. patent application Ser. No. 09/345, 920. Hooks are embedded into the JavaScript environment which recognize branch decisions (if statements) based on strings which contain the placeholders. In such cases the execution is invalidated since this implies the input affects the logical procession of the script. The system can validate links if the place holder affects the generated URL directly by appearing in it, or indirectly by affecting the program's execution flow.

Control passes from Block 160 to Block 165 or, if no free-text input commands are encountered from Block 155 to Block 165. At Block 165 the authorization proxy detects an occurrence of a command requesting input by the user from one of a number of possible input values. If such a command is encountered, control passes to Block 170, otherwise control passes to Block 180. At Block 170, a first available value for an enumerated input control is assigned. Since other possible legal input value are available, control passes to block 175 where an entry is made in a backtrack log 116 (FIG. 2). The entry records the relative position of current execution within the HTML page 102 (e.g., depth in the execution) as well as the remaining number of possible legal entries. It should be appreciated that the log 116 permits control to loop back to the previous point of execution (depth), select a next value of the possible legal input values and continue execution with the next legal input value. By looping back and simulating execution of all inputs to the HTML page 102, all possible browser commands and user inputs thereto are collected within the list of possible legal actions 118 discussed above.

The execution continues at Block 180 after logging the value provided. At Block 180, the simulator detects an end of the code. If the end is detected, control passes to Block 185 for possible backtrack processing. If the end is not encountered, control loops back to Block 150 where simulation continues as described above. At Block 185 the backtrack log 116 is evaluated to determine whether possible additional input values may drive detection of further possible legal actions. If entries remain in the backtrack log 116 the depth variable is utilized to relocate execution at one of the encountered multiple input commands. Once relocated, a next value of the input command is assigned and simulation proceeds from the relative location forward to the end of the code. Such looping back execution continues until each value in the backtrack log 116 is exhausted.

The inventors have determined that one implementation of backtracking in the JavaScript environment is to restart the execution with the same values until the backtracking point. Another legal input is provided at this time and logged. This process is iterated until all enumerated values have been processed.

As described above, by aggregating all the browser actions triggered by all possible inputs and events during the simulation process, the authorization proxy obtains a list of most, if not substantially all, possible requests from the client which are consistent with the script originating in the web server. In some embodiments, this system is used as an auxiliary for the trace embodiment, described below, to obtain better performance.

The following describes an example of the simulation embodiment of the present invention:

An HTML page (e.g., HTML page 102) contains 3 input controls:

An option list of 2 countries: U.S. & Israel (A full list is possible, of course)

A radio selection of gender: male & female.

A text input for the name of the user.

A JavaScript incorporated within the HTML constructs a URL according to the following pattern.

http://site.country.perfectotech.com/gender/name.html where country is one of "us" or "il" according to country, gender is a value of "boys" or "girls" and name is an input text field.

The following is the HTML page code:

```
<HTML>
<HEAD>Test Page</HEAD>
<BODY>
<SCRIPT LANGUAGE=JavaScript>
function openPage ( )
{var url="http://site.";
if       (document.form1.country.selectedIndex—0)
    [BRANCH A]url+="us";
else if (document.form1.country.selectedIndex—1) url+=
    "il";
else url+="intl";
url+=".perfectotech.com/"
if    (document.form1.gender[0].checked)    [BRANCH
    B]url+="boys";
else url+="girls";
url+="/"+document.form1.name.value+".html";   [AC-
    CESS C]
var w=window.open (url); }
</SCRIPT>
<FORM     NAME=form1     ACTION=javascript:open
    Page ( )>
Choose your country
<BR>
<SELECT NAME=country>
<OPTION>U.S.</OPTION>
<OPTION>Israel</OPTION>
</SELECT>
<BR>
Your gender is
<BR>
<INPUT          TYPE=RADIO          NAME=gender
    VALUE="male">male
<INPUT          TYPE=RADIO          NAME=gender
    VALUE="female">female
<BR>
Your name is
<INPUT TYPE=TEXT NAME=name LENGTH=10>
<BR>
<INPUT   TYPE=BUTTON   VALUE="Get   My   Page"
    onClick="openPage ( )">
</FORM>
</BODY>
</HTML>
```

The simulation process described above handles the code as follows:

1. An examination of the document yields that the only event which executes JavaScript is clicking on the Get My Page button. The event is triggered. This is noted in the backtracking log 116, with an annotation that this was the only event to trigger, thus this entry is exhausted. Exhaustion is explained in more details in subsequent steps.

2. Code is executed until Branch A is reached.

3. A value is supplied for the country in selectedIndex, there are two possible values: 0 (for U.S.) and 1 (for Israel). The first is supplied and it is noted that a value of 0 was supplied at Branch A.

4. Execution proceeds to Branch B, where the checked value of the Gender radio box is checked. There are two possible values true (boys) and false (girls). A value of true is supplied and noted in the backtracking log 116.

5. Execution proceeds until Access C is reached where a value for the text field is required. A place holder is supplied. This place holder is a UNICODE string which cannot appear under normal circumstances. This place holder is marked as <PHname>. There is no need to log this in the backtracking log 116, since no backtracking is required over this value. The type of <PHname> is noted as text of maximum length 10.

6. The JavaScript function open of the object window is hooked in the simulated environment to a function which records the requested URL. The constructed URL would look as follows:

http://site.us.perfectotech.com/boys/<PHname>.html.

7. The policy enforcer is informed of this new possible action with the associated annotation that <PHname> can be matched against any text of maximum length 10.

8. The execution restarts. The same steps are followed except for the deepest backtracking entry (Branch B) where the value is replaced with the next possible value—false. Since all possible values of Branch B have been exhausted, it is marked as exhausted in the backtracking log 116.

9. Thus, a value of "girls" is provided in the gender field and the generated link would be:

http://site.us.perfectotech.com/girls/<PHname>.html.

10. Execution restarts. This time Branch A is the deepest branch, and its next allowed value is provided—1. for Israel.

11. Branch B is reached again, this time no backtracking log 116 exists, so a (re)newed entry is logged and the first legal value is provided—true (boys).

12. Execution resumes in the same pattern, the link obtained this time is:

http://site.il.perfectotech.com/boys/<PHname>.html.

13. This process continues iteratively (e.g., one more time providing a value of "girls" for the gender field) until all backtracking logs have been exhausted. Thus no more execution paths are possible.

In reviewing the JavaScript code, a theoretical execution path is seen which could have generated the request http://site.intl.perfectotech.com/. . . , this path was not taken sine the DOM did not provide selectedIndex for country which was other than 0 or 1. This is an example of how both the JavaScript code and the DOM affect the allowed requests. Since there were only two possible values for the country, the third execution path is not a legal path.

In a second aspect of the present invention, the authorization proxy (e.g., proxy 18, "plug-in" logic 26 and sniffer 40) invokes methods for evaluating transmissions between clients and servers. Firstly, client-side logic is instrumented by inserting code to trace an execution of the client-side logic on the client system 12. Once executed by the user on the client system 12, requests for server resources are received at the authorization proxy along with the results of an actual execution (the trace results). The authorization proxy simulates execution of the client-side logic and when input options or other requests for external data are encountered during the simulation the trace results are utilized. A successful simulation results in the approval of the client request for server resources and the authorization proxy passes the request to the appropriate server for actual processing. For example, transmissions having acceptable actions are passed onto the intended target such that only requests consistent with the intended application are performed.

Figure 4:
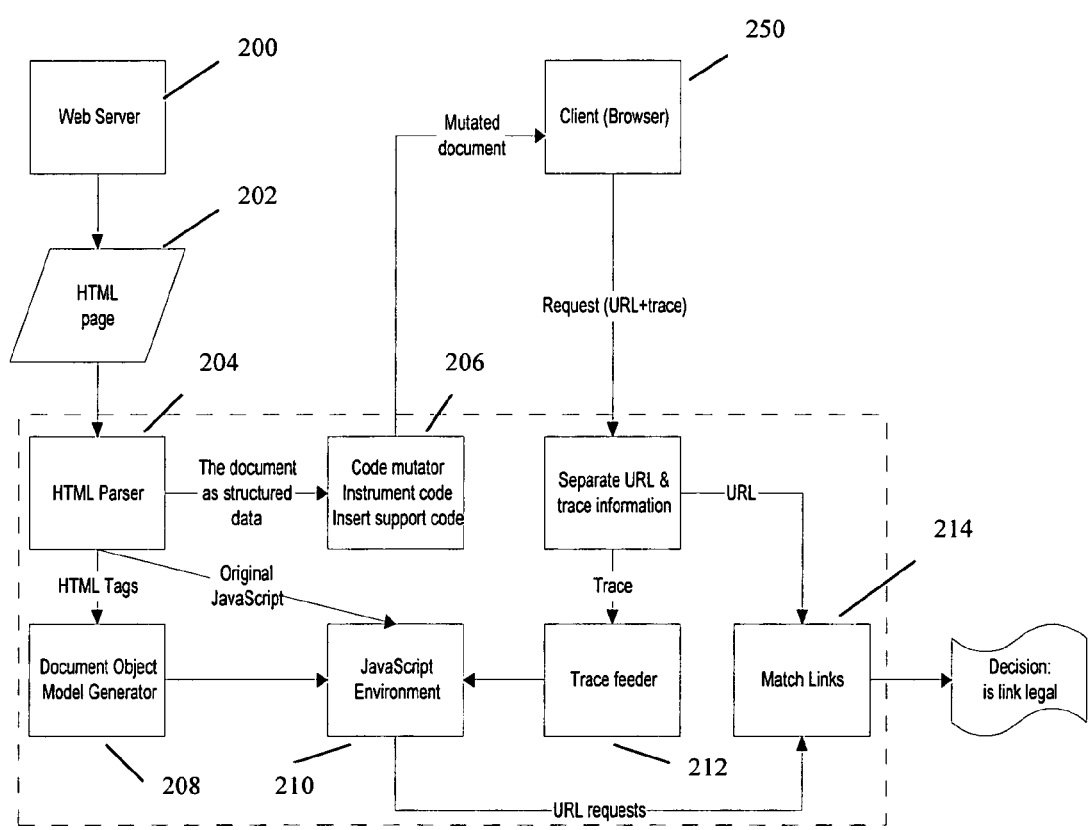
FIG. 4 is a flow chart illustrating an exemplary process for verifying requests between clients and servers using a tracing method in accordance with a second embodiment of the present invention.

FIG. 4 is a flowchart illustrating a process for verifying transmissions between clients and servers of a data processing system (e.g., the aforementioned tracing and simulating processes). For example, FIG. 4 depicts a transmission (e.g., an HTML web page 202) from a web server 200 to a client 250. In accordance with the present invention, the authorization proxy (e.g., proxies 18, 26 and 40 of FIGS. 1A, 1B and 1C, respectively) intercepts the transmission 202. Before entering a simulation process, the authorization proxy prepares the transmission for receiving commands that allow a tracing of values and events occurring on the client browser 250. At Block 204 the transmission (e.g., HTML page 202) is parsed to identify content and HTML tags and client side logic (e.g., JavaScript code). The client side logic is passed to Block 206 where code for tracing browser actions (e.g., requests for and actual input values, events, etc.) is added. The mutated or instrumented code is next passed to the client browser 250 within the requested transmission (e.g., within the HTML page 202).

As described above, the instrumented code traces the browser actions and returns to the authorization proxy (within or in addition to a request for further action) the results of the trace. When the client browser 250 requests server resources the trace of browser actions (e.g., inputs and events performed on the client browser 250) are returned to the authorization proxy for evaluation. In this embodiment, instead of enumerating on all inputs (as was described above with reference to the simulation process outlined in FIG. 2), the browser sends with its request a trace of all values the script obtained during an actual user session in the browser environment. The trace is maintained within the authorization proxy at a trace feeder (Block 212).

Once the results of a trace are received, the authorization proxy simulates the code and DOM components within the original transmission (e.g., the HTML page 202), at Block 210. As shown in FIG. 4, the input to the simulation step include the original client side code (e.g., client side logic without the trace supporting code), the DOM components (from Block 208) and the trace results from the trace feeder (from Block 212). When a traced object is queried in the simulated environment (at Block 210), the authorization proxy (via a trace feeder) checks for the traced values received from the client. The traced values are also checked against the logical content rules of the object, e.g., a maximum number of allowable characters within a text field or a checkbox value that can only be one of two possible values (true/false), any other value is illegal. The results of the simulation are a list of allowable or authorized browser actions that are passed to Block 214. However, in this embodiment, the authorized browser actions are based on values (input and events from within the trace) determined from a particular execution at a client browser and not all possible browser requests as described above with reference to the first verification process. The client actions (passed from Block 250) are compared to the authorized actions (passed from Block 210) at Block 214 such that a decision can be made as to whether the requested action or actions of a particular client browser execution (Block 250) are authorized.

As should be appreciated, the browser does not perform and/or send results of a trace by default. Therefore, the code (e.g., HTML document 202) sent to the browser is mutated (instrumented), in the aforementioned step performed at Block 206, prior to simulation so that it will create and return the trace of the browser actions in the browser environment (Block 250). An exemplary instrumentation process for the code includes:

The JavaScript code is compiled into JavaScript assembly.

The assembly is examined, marking all get_property, set_property and function calls.

Get_property instructions are checked against relevant property names.

Function calls are checked against traced function values (e.g. random) and action functions (e.g. window.open ( ) which opens a new window with a new URL).

Function calls are inserted before each of the relevant instructions check whether the objects are relevant to the trace or not.

For get_property values of objects which are traced are added to an execution trace.

For set_property of an object which causes a new URL to be loaded the trace is appended to the URL.

For function calls which load a new URL a trace is appended to the URL.

The assembler is decompiled (using the built-in decompiler) back to JavaScript.

The mutated JaveScript code is sent to the client instead of the original JavaScript code.

The following is an example of code and the mutated code sent to the browser.

The original code is:
<SCRIPT>
function my_send( ) {var req; var day=document.forms[0].elements.day.value; if ((day—"sunday")||(day—"monday")||(day—"tuesday")||(day—"wednesday")||(day—"thursday")||(day—"friday")||(day—"saturday")) {window.location.href="new_page?"+day; }}
</SCRIPT>
The HTML document has the following form in it:
<FORM NAME="form1">
Purchase ticket for day:     <INPUT SIZE=20 TYPE="TEXT" NAME="day" VALUE="sunday"> <br> <br>
Click to submit:     <INPUT TYPE="BUTTON" NAME="send" VALUE="Send"onclick="my_send( );"> <br>
</FORM>
The mutated code is:
<SCRIPT>
as_.init (0);
function my_send( ) {var as_tmp=new Array( ); var req; var day=(as_tmp[2]=(as _tmp[1]=0, as _tmp[0]=document.forms,
as_prop(as_tmp[0], as_tmp[1])).elements.day, as_prop (as_tmp[2], "value")); if ((day—"sunday")||(day—"monday")||(day—"tuesday")||(day—"wednesday")||(day—"thursday")||(day—"friday")||(day—"saturday")) {(as_tmp[5]="www.perfecto.com/JS?"+day, as_tmp[4]=window.location, as_setprop(as_tmp[4], as_tmp[5], "href")); }
}
</SCRIPT>
The mutation to the HTML form is:
<FORM NAME="form1">
Purchase ticket for day:     <INPUT SIZE=20 TYPE="TEXT" NAME="day" VALUE="sunday"> <br> <br>
Click to submit:     <INPUT TYPE="BUTTON" NAME="send" VALUE="Send" onclick="as_.init(1); may_send( );"> <br>
</FORM>

The mutated code calls as_.prop on get_property of document.forms[0] to check that it's a form and then for the elements.day.value. The as_.prop function checks whether the value should be traced (as is in a value of a text field), and adds the value to a trace variable. The set_property is modified to add the trace to the requested URL. The as_.init is added both at the head of the script and at the event handlers. When an event handler is triggered, the event is added to the trace. Once the trace is sent to the authorization proxy, it is processed as explained above.

Following is a description of the process where by the user chooses to purchase a ticket for Monday. The code has been instrumented as listed above. However, the user sees a very simple form in his browser, identical to the one he would have seen had the code not been instrumented:

A text specifying that a day for ticket purchase should be chosen

A simple text box with a default value of "sunday"

A button to send the request

Let's assume our user enters "tuesday" and sends the request by selecting the send button. What actually happens is as follows. In the browser:

Selecting the send button activates an event handler which calls my_send function. However, activating an event handler is a traced action thus it is added to the execution trace by as_init in the instrumented code.

The JavaScript function my_send is called. This function is supposed to verify that the day matches one of the weekdays and replace the page with the matching page: new_page?day.

In my_send the value: document.forms[0].elements.day.value is accessed it is identified by as_prop as a traced value. Thus the value "document.forms[0].elements.day.value=tuesday" is added to the trace.

When the code window.location.href="new_page?"+day is executed in the instrumented code, as_setprop identifies the variable as a traced event variable. Normally a single request would have been generated for the newly set URL. In the instrumented code, an additional request containing the generated trace is sent to the server.

In the server we now got both request and trace.

The original code is executed in a simulated environment.

The trace feeder identifies the activation of the event handler for the send button, the event handler is triggered.

The event handler calls my_send.

My_send attempts to access the variable "document.forms[0].elements.day.value" which is a traced object.

Thus the trace feeder retrieves the value "tuesday" from the execution trace.

The trace feeder verifies that matches the legal input in a text box of size 20.

The value is provided to the JavaScript code.

The JavaScript code verifies that "tuesday" is indeed a weekday and sets window.location.href="new_page?tuesday".

Setting this attribute causes an event which matches the simulated request for "new_page?tuesday" to the actual request, which matches correctly.

Had a user of a client system (e.g., a hacker operating client 12) attempted to provide a value which does not constitute a legal input for a text field of size 20 (e.g. a 21 characters input), the trace feeder would have blocked it by marking it as an illegal input and stopping the execution.

Had the user attempted to provide an illegal request, then matching the simulated environment action with the actual request, would have failed.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for authorizing execution of requested actions transmitted between clients and servers of a data processing system, the method comprising:
    receiving a plurality of server messages from a server, each server message including a set of actions;
    simulating execution of each set of actions upon receipt of the plurality of server messages;
    based on each simulated execution, building or supplementing a list of allowable actions or user-definable inputs to the allowable actions in response to receiving a server message corresponding to the simulated execution;
    receiving one or more client messages from one or more clients, each client message including one or more user-requested actions or inputs;
    comparing the list of allowable actions or user-definable inputs in existence prior to receipt of the one or more client messages to the user-requested actions or inputs; and
    where the list of allowable actions or user-definable inputs includes the user-requested actions or inputs, authorizing execution of the user requested actions or inputs, and supplementing the list of allowable actions or user-definable inputs upon receipt of a subsequent server message in response to the authorized execution.

2. The method as set forth in claim 1, wherein the step of simulating comprises identifying all possible actions or inputs to the possible actions resulting from an execution of each set of actions at a client.

3. The method as set forth in claim 1, wherein the step of simulating comprises invoking and triggering each command, field, user-selectable input option and HTTP request within each set of actions.

4. The method as set forth in claim 1, wherein the user-requested actions or inputs include actions or inputs provided during a user session performed in response to receipt of a server message at a client.

5. The method as set forth in claim 1, comprising:
    during the step of simulating, detecting an input control requesting entry of a data value and assigning a unique place holder to represent the data value; and
    during the step of comparing, matching a pattern of the unique place holder to the input received from the user.

6. The method as set forth in claim 1, wherein the step of simulating comprises:
    detecting an input control requesting selection of one of a plurality of predefined data values; and
    iteratively selecting one of the plurality of predefined data values and continuing simulation of the set of actions and building or supplementing of the list of allowable actions or user-definable inputs with the selected one data value until each of the plurality of predefined data values is selected and listed.

7. The method as set forth in claim 1, comprising:
    prior to the step of simulating, tracing execution of the set of actions at a client; and
    during the step of simulating, providing results of the tracing in response to the user-definable inputs.

8. The method as set forth in claim 1, comprising:
    prior to the step of simulating:
        identifying actions within a set of actions of a server message;
        supplementing the server message with actions for tracing input to the identified actions; and
        transmitting the supplemented server message to a client; and
    during the set of simulating, providing results of the tracing as user-definable inputs to the identified actions are requested.

9. The method as set forth in claim 8, wherein the results of the tracing are included within a client message.

10. The method as set forth in claim 8, wherein the results of the tracing are included in a client message that is received prior to receipt of a client message that is sent in response to the server message.

11. A method for authorizing execution of requested actions transmitted from a client to a server of a client/server data processing system, the method performed by a gateway coupled between the client and the server, comprising:
    receiving, from the server, a plurality of documents, each document including a set of actions;
    simulating execution of each set of actions upon receipt of the plurality of documents;
    based on each simulated execution, building or supplementing a list of allowable actions or user-definable inputs to the allowable actions in response to receiving from the server a subsequent document corresponding to the simulated execution;
    receiving, from the client, one or more messages, each message including one or more user-requested actions or inputs;
    comparing the list of allowable actions or user-definable inputs in existence prior to receipt of the one or more messages to the user-requested actions or inputs; and
    where the list of allowable actions or user-definable inputs includes the user-requested actions or inputs, transmitting the user-requested actions or inputs to the server for execution, and supplementing the list of allowable actions or user-definable inputs upon receipt of a subsequent document from the server in response to the transmitted user-requested action or input.

12. The method as set forth in claim 11, comprising storing, at the gateway, the list of allowable actions or user-definable inputs.

13. A method for authorizing execution of requested actions transmitted between clients and servers of a data processing system, the method comprising:
    receiving a plurality of server messages, each server message including programmable logic integrated with a client application;
    simulating execution of each programmable logic upon receipt of the plurality of server messages;
    based on each simulated execution, building or supplementing a list of allowable actions associated with the programmable logic or user-definable inputs to the allowable actions in response to receiving a server message corresponding to the simulated execution;
    receiving one or more client messages from one or more clients, each client message including one or more user-requested actions or inputs;

comparing the list of allowable actions associated with the programmable logic or user-definable inputs in existence prior to receipt of the one or more client messages to the user-requested actions or inputs; and where the list of allowable actions associated with the programmable logic or user-definable inputs includes the user-requested actions or inputs, authorizing execution of the user requested actions or inputs, and supplementing the list of allowable actions associated with the programmable logic or user-definable inputs upon receipt of a subsequent server message in response to the authorized execution.

* * * * *